(12) United States Patent
Arnedo et al.

(10) Patent No.: US 10,381,952 B2
(45) Date of Patent: Aug. 13, 2019

(54) UNIVERSAL POWER ELECTRONIC CELL FOR DISTRIBUTED GENERATION

(71) Applicant: United Technologies Corporation, Farmington, CT (US)

(72) Inventors: Luis Arnedo, Cary, NC (US); Shashank Krishnamurthy, Glastonbury, CT (US); Vladimir Blasko, Avon, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/751,549

(22) PCT Filed: Oct. 2, 2015

(86) PCT No.: PCT/US2015/053669
§ 371 (c)(1),
(2) Date: Feb. 9, 2018

(87) PCT Pub. No.: WO2017/058242
PCT Pub. Date: Apr. 6, 2017

(65) Prior Publication Data
US 2018/0234031 A1 Aug. 16, 2018

(51) Int. Cl.
*H02M 7/538* (2007.01)
*H02M 7/5387* (2007.01)
*H02J 3/38* (2006.01)
*H02J 3/00* (2006.01)
*H02M 1/00* (2006.01)

(52) U.S. Cl.
CPC ......... *H02M 7/53871* (2013.01); *H02J 3/383* (2013.01); *H02J 3/386* (2013.01); *H02J 3/387* (2013.01); *H02J 3/381* (2013.01); *H02J 2003/007* (2013.01); *H02M 2001/0012* (2013.01); *H02M 2007/53876* (2013.01); *Y02E 10/563* (2013.01); *Y02E 10/763* (2013.01)

(58) Field of Classification Search
CPC ...... H02M 7/53871; H02J 3/383; H02J 3/386; H02J 3/387
USPC ......................................... 363/95–98; 703/18
See application file for complete search history.

(56) References Cited

U.S. PATENT DOCUMENTS

| 5,347,466 | A | | 9/1994 | Nichols et al. | |
|---|---|---|---|---|---|
| 6,122,603 | A | * | 9/2000 | Budike, Jr. | G01D 4/004 702/182 |
| 8,257,018 | B2 | | 9/2012 | Coffey | |
| 2002/0193978 | A1 | * | 12/2002 | Soudier | G05B 17/02 703/18 |

(Continued)

OTHER PUBLICATIONS

International Search Report and Written Opinion for PCT Application No. PCT/US2015/53669, dated Jan. 7, 2016.

(Continued)

*Primary Examiner* — Yemane Mehari
(74) *Attorney, Agent, or Firm* — Carlson, Gaskey & Olds, P.C.

(57) ABSTRACT

A method of configuring a power conversion cell for a distributed power system according to an example of the present disclosure includes: importing one or more software modules onto a controller of a conversion device configured to control power conversion with one or more of the modules selected based on one or more of a load or source device, and the results of a software simulation.

20 Claims, 6 Drawing Sheets

(56) References Cited

U.S. PATENT DOCUMENTS

| | | | | |
|---|---|---|---|---|
| 2006/0197507 | A1* | 9/2006 | Wang | H02J 7/345 |
| | | | | 320/166 |
| 2011/0176919 | A1* | 7/2011 | Coffey | F03D 3/005 |
| | | | | 416/124 |
| 2012/0032515 | A1 | 2/2012 | Ledenev et al. | |
| 2012/0048325 | A1* | 3/2012 | Matsuo | H02H 7/20 |
| | | | | 136/244 |
| 2015/0155825 | A1* | 6/2015 | Sella | H01L 31/02021 |
| | | | | 439/540.1 |

OTHER PUBLICATIONS

Ciobotaru, M., Kerekes, T., Teodorescu, R., and Bouscayrol, A. (2006). PV inverter simulation using MATLAB/Simulink graphical environment and PLECS blockset. IEEE Industrial Electronics Annual Conference. Nov. 1, 2006. New Jersey, USA. pp. 5313-5318.

Weaver, W., and Parker, G. (2014). Real-time hardware-in-the-loop simulation for optimal Dc microgrid control development. 2014 IEEE 15th Workshop on Control and Modeling for Power Electronics. Jun. 22, 2014. pp. 1-6.

European Search Report for European Application No. 15905621.7 dated Sep. 21, 2018.

\* cited by examiner

UNIVERSAL POWER ELECTRONIC CELL FOR DISTRIBUTED GENERATION

BACKGROUND

This disclosure relates to power distribution systems, and more specifically, but not limited to, providing a universal power conversion cell and software control capable of integrating all types of energy sources and loads.

Power distribution systems may incorporate a plurality of different types of energy sources and storage devices, as well as a plurality of different types of loads to be serviced. Each source or storage device may require power conversion equipment to provide consistency in the form of energy supplied by the system. For example, a wind or solar powered source delivers energy in a different format than another type of source. There are challenges associated with providing power to a distribution system using multiple, different sources and storage devices.

SUMMARY

A method of configuring a power conversion cell for a distributed power system according to an example of the present disclosure includes: importing one or more software modules onto a controller of a conversion device configured to control power conversion with one or more of the modules selected based on one or more of a load or source device, and the results of a software simulation.

In a further embodiment of any of the forgoing embodiments, the software simulation includes: selecting one or more software modules for the controller based upon at least one characteristic of the load device or source device, modeling the one or more software modules on a modeling control board in a simulation mode to simulate a power conversion involving the load device or source device, and obtaining simulation results from the simulation mode.

A further embodiment of any of the forgoing embodiments includes; determining if the simulation results meet at least one predetermined criteria, altering at least one module if the simulation results do not meet the at least one predetermined criteria, repeating the modeling step and altering until the simulation results meet the at least one predetermined criteria and importing the modules onto the controller when the simulation results meet the at least one predetermined criteria.

In a further embodiment of any of the forgoing embodiments, the load device or source device is an alternating current source.

In a further embodiment of any of the forgoing embodiments, the load device or source device is a direct current source.

In a further embodiment of any of the forgoing embodiments, the load device or source device is one of a wind turbine or solar inverter.

A system for configuring a power conversion device for use with a selected apparatus that is associated with the distributed power system according to an example of the present disclosure includes a modeling device including a model control board configured to receive a plurality of software modules for modeling a power conversion for the selected apparatus, a simulator that utilizes the model control board with the software modules to simulate a power conversion for the selected apparatus, and an installer for installing the software modules onto a controller of a power conversion device that has a configuration of hardware components and the controller. The configuration is the same for all plurality of power conversion devices, and each of the plurality of power conversion devices is configured to be associated with a variety of apparatus. The conversion device includes the installed software modules being configured for power conversion associated with the selected apparatus.

In a further embodiment of any of the foregoing embodiments, the selected apparatus is at least one of a power source or a load.

In a further embodiment of any of the foregoing embodiments, the selected apparatus is a wind turbine.

In a further embodiment of any of the foregoing embodiments, the selected apparatus is a solar inverter.

In a further embodiment of any of the foregoing embodiments, the selected apparatus is a fuel cell.

In a further embodiment of any of the foregoing embodiments, the selected apparatus is a battery.

In a further embodiment of any of the foregoing embodiments, the selected apparatus is an appliance.

In a further embodiment of any of the foregoing embodiments, the selected apparatus is an HVAC system In a further embodiment of any of the foregoing embodiments, the selected apparatus is an elevator.

In a further embodiment of any of the foregoing embodiments, the selected apparatus is a lighting system.

In a further embodiment of any of the foregoing embodiments, the selected apparatus is an ultra-capacitor.

In a further embodiment of any of the foregoing embodiments, the software modules are imported from the model control board into the controller.

A power conversion device according to an example of the present disclosure includes a configuration of hardware components to be associated with a variety of apparatus and a controller configured to receive one or more software modules for controlling a power conversion of a selected one of the variety of apparatus. The one or more software modules are selected based on the selected one of the variety of apparatus and the results of a software simulation.

The various features and advantages of embodiments will become apparent to those skilled in the art from the following detailed description. The drawings that accompany the detailed description can be briefly described as follows.

DETAILED DESCRIPTION

Figure 1:
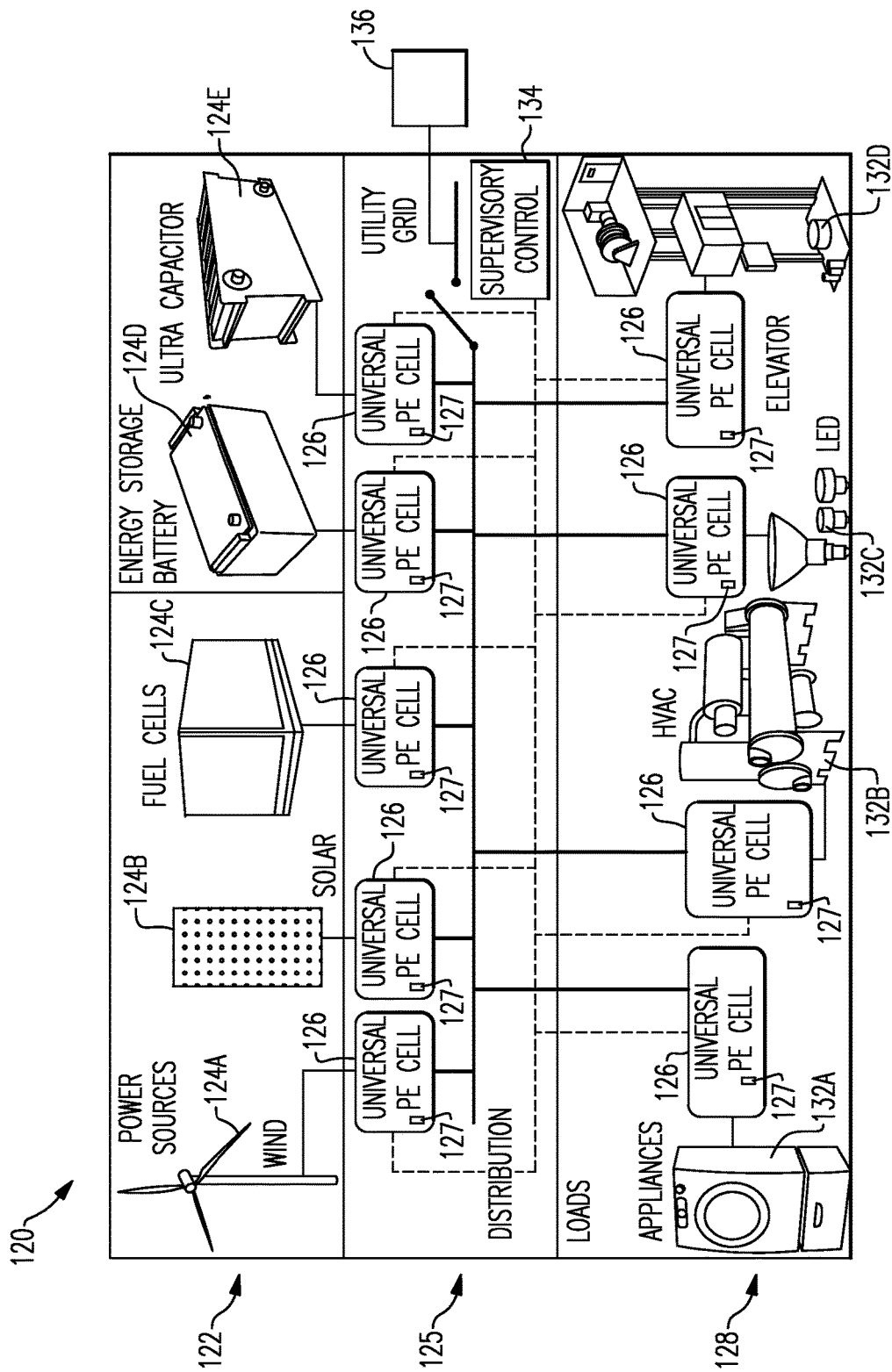
FIG. 1 schematically shows an example energy distribution system designed according to an embodiment.

FIG. 1 schematically shows an energy distribution system 120 designed according to an embodiment. At the source level 122, a plurality of energy sources 124 are connected to the system 120. These energy sources 124 may include, but are not limited to, power sources such as wind turbines 124A, solar inverters 124B, and fuel cells 124C, as well as energy storage units such as batteries 124D and ultracapacitors 124E. The plurality of sources 124 are each connected to the distribution level 125 through a respective plurality of power conversion cells 126. Each power conversion cell 126 is equipped with hardware that can be considered universal or universally applicable because it is the same for each power conversion cell 126 and can be used with a variety of sources. Each power conversion cell 126 includes a control board 127 for receiving software modules that are customizable via software modeling to render the conversion cell 126 appropriate for the particular device with which it is associated.

Power may be distributed to the load level 128, which includes a plurality of loads 132 in this example. The loads 132 may include, but are not limited to, appliances 132A, HVAC systems 132B, lighting 132C, and elevators 132D. Before reaching the plurality of loads 132, the power from the distribution level 125 may be converted through additional power conversion cells 126 customized through software to convert power provided to that specific load 132. Each power conversion cell 126 is universally compatible with alternating current and direct current loads, but customizable via software implementation, which in some embodiments may be achieved through modeling. The same hardware components may be included in universal power conversion cells that can be used at the distribution level 125 or the load level 128. Implementation is more efficient and economical because an inventory of conversion cells may be used and only a customized set of software modules is needed for a variety of different situations.

Figure 2:
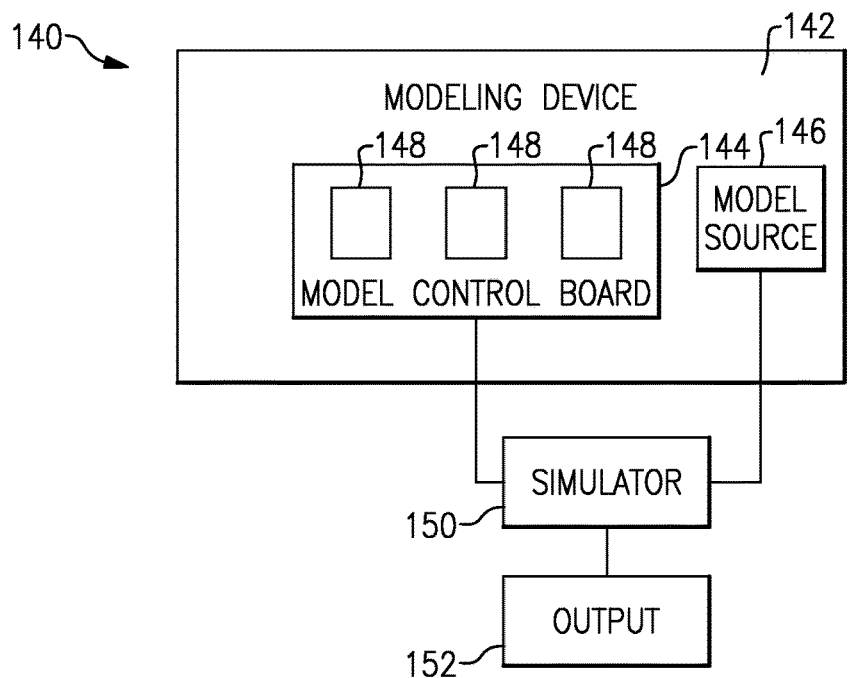
FIG. 2 schematically shows an example software modeling system, according to an embodiment.

FIG. 2 schematically shows an example modeling system 140 for modeling a software control function for a power conversion cell 126, according to an embodiment. A modeling device 142 includes a model control board 144 and a model source 146. The model control board 144 represents a control board 127 of a power conversion cell 126, and the model source 146 represents a source 124 of a power distribution system 120. A plurality of software modules 148 are loaded onto the model control board 144. The software modules 148 form a model control function for controlling a power conversion from the model source 146. The modeling device 142 is in communication with a simulator 150, which runs a simulation of the power conversion of the model source 146 based on the software modules 148 and produces an output 152 of the results.

Figure 3:
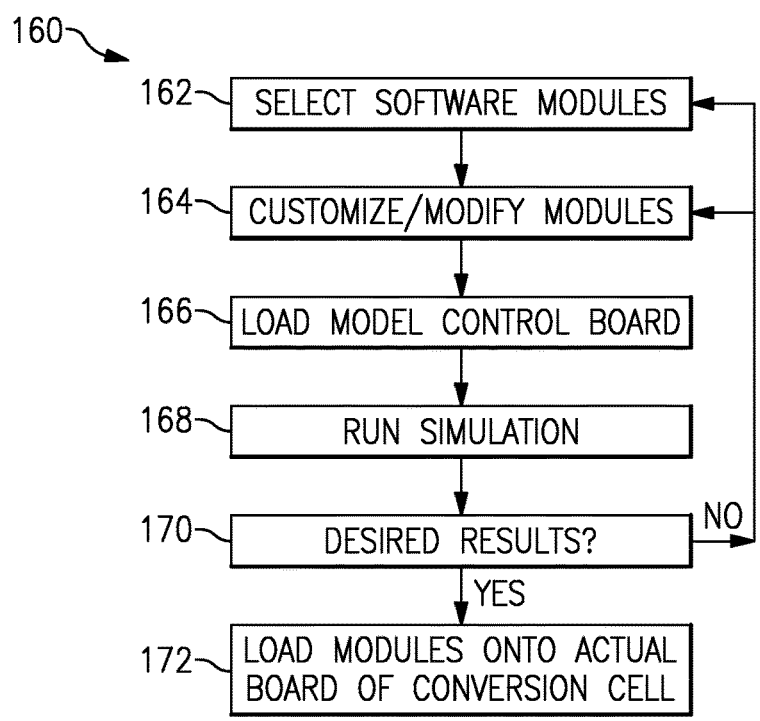
FIG. 3 schematically shows an example method for programming a power conversion cell, according to an embodiment.

FIG. 3, with continued reference to FIGS. 1 and 2, schematically shows a method 160 for programming a power conversion cell 126, according to an embodiment. At 162, a programmer selects the appropriate software modules 148, and at 164, the programmer customizes and modifies the software modules 148 into a model control function. At 166, the programmer loads the software modules 148 onto the model control board 144. At 168, a simulation of a power conversion of a model source is run, and, at 170, the results of the simulation are produced and reviewed. If the results are desirable, the software modules 148 are then loaded, at 172, onto the actual control board 127 of the power conversion cell 126. If the results are not desirable, the programmer may return to steps 162 or 164 to modify the control function.

Figure 4:
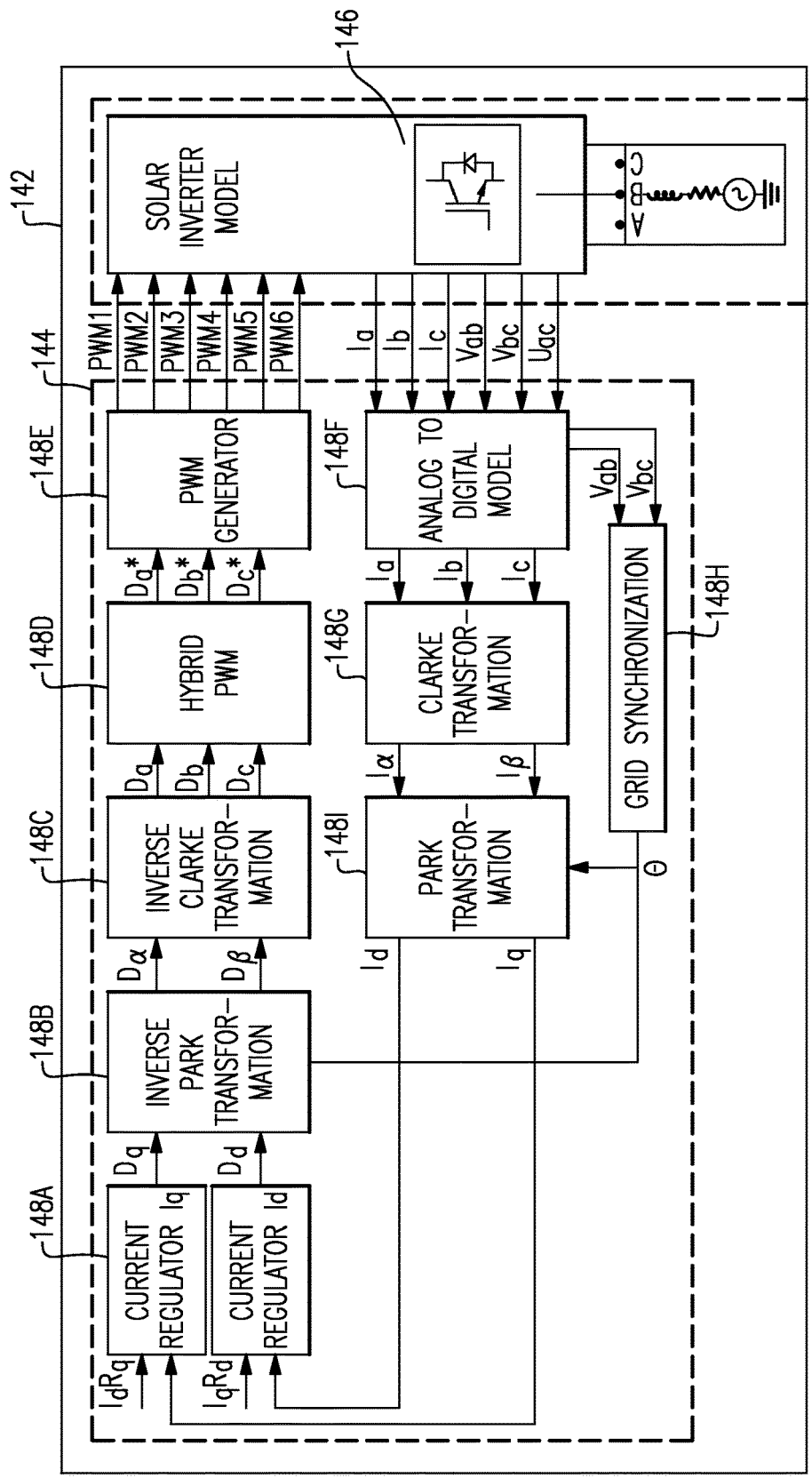
FIG. 4 schematically shows an example modeling device, according to an embodiment.

FIG. 4 shows an example modeling device 142 including a model control board 144 and a source model 146. In the example, the source model 146 is a solar inverter model representative of a solar inverter as a source 124 in a power distribution system 120. A plurality of software modules 148 are loaded onto the model control board 144 and form a model control function for controlling the power conversion of the model solar inverter 146. In the example, the modules 148 are Simulink S-function modules. The example modules 148 include a Current Regulator 148A, an Inverse Park Transformation 148B, an Inverse Clarke Transformation 148C, a Hybrid Pulsewidth Modulator 148D, a Pulsewidth Modulator Generator 148E, an Analog to Digital Converter 148F, a Clarke Transformation 148G, a Grid Synchronization 148H and a Park Transformation 148I.

Figure 5:
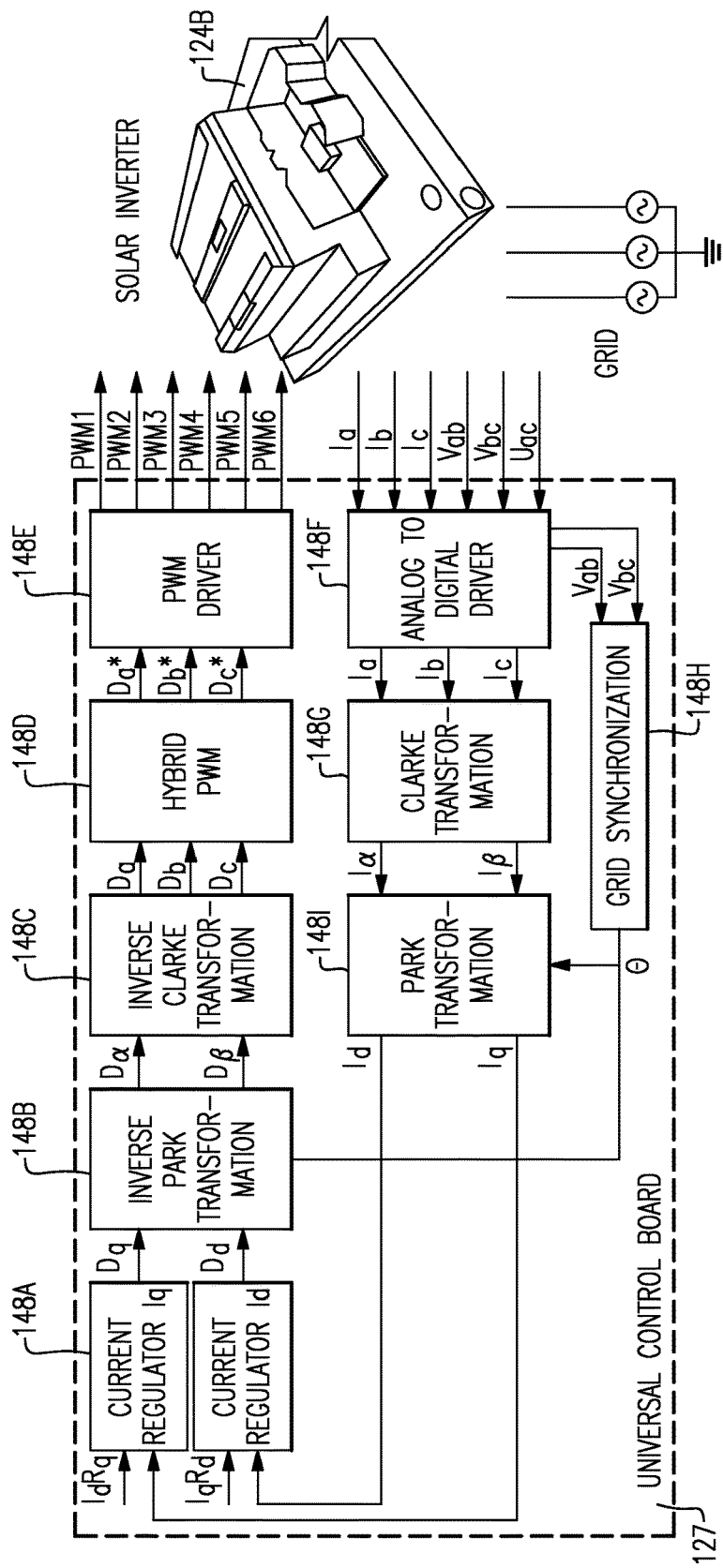
FIG. 5 schematically shows a control board of an example power conversion device, according to an embodiment.

FIG. 5 shows an example universal control board 127 of a power conversion cell 126 for converting power from a solar inverter 124B. As shown, the same modules 148 from the model control board 144 of FIG. 4 are loaded onto the universal control board 127 of the power conversion cell 126. Power conversion from the actual solar inverter 124B is thus controlled by this control function comprised of the software modules 148 imported onto the universal control board 127 from the model control board 144. As on the model control board 144, the modules 148 on the actual control board 127 include a Current Regulator 148A, an Inverse Park Transformation 148B, an Inverse Clarke Transformation 148C, a Hybrid Pulsewidth modulator 148D, a Pulsewidth Modulator Generator 148E, an Analog to Digital Converter 148F, a Clarke Transformation 148G, a Grid Synchronization 148H and a Park Transformation 148I. The same code is thus used in simulation and hardware implementation, and the code written on the model controller is imported directly onto the control board 156. These modules 148 are examples for discussion purposes and those skilled in the art who have the benefit of this disclosure will realize what specific modules will be useful for their particular situation.

The system 120 allows for multiple and various types of sources 124 and loads 132 to operate seamlessly. The hardware of the universal power conversion cell 126 is operable to receive various software modules 148 and to control power conversion from one of a plurality of different sources 124 or to one of a plurality of different loads 132, depending on the control function imported onto it. If a different source 124 or load 132 is desired later, a new control function of software modules 148 associated with that source 124 or load 132 can be imported onto the same control board 127 for controlling the desired power conversion.

The system 120 is capable of integrating all types of distributed sources and energy storage units with AC or DC grids. The system 120 may also integrate AC and DC sources with external AC or DC loads. The only required modification is a change in software implemented onto the universal control board 127 of the universal power converter cell 126.

The system 120 thus has the ability to function without a supervisory control 134 (see FIG. 1) because the power conversion cells 126 have the ability to control power conversion on their own. Power conversion is controlled by the software modules 148 implemented onto the control board 127 of each universal power converter cell 126. However a supervisory control 134 may alternatively be used to optimize the system.

Figure 6:
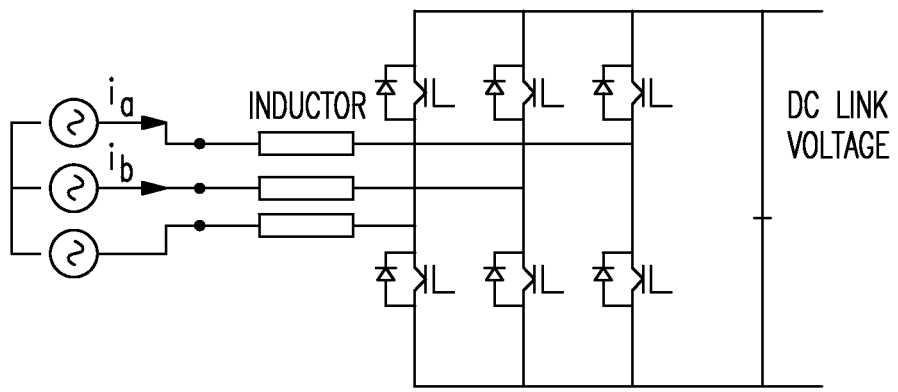
FIG. 6 schematically shows an example boost rectifier, according to an embodiment.
Figure 7:
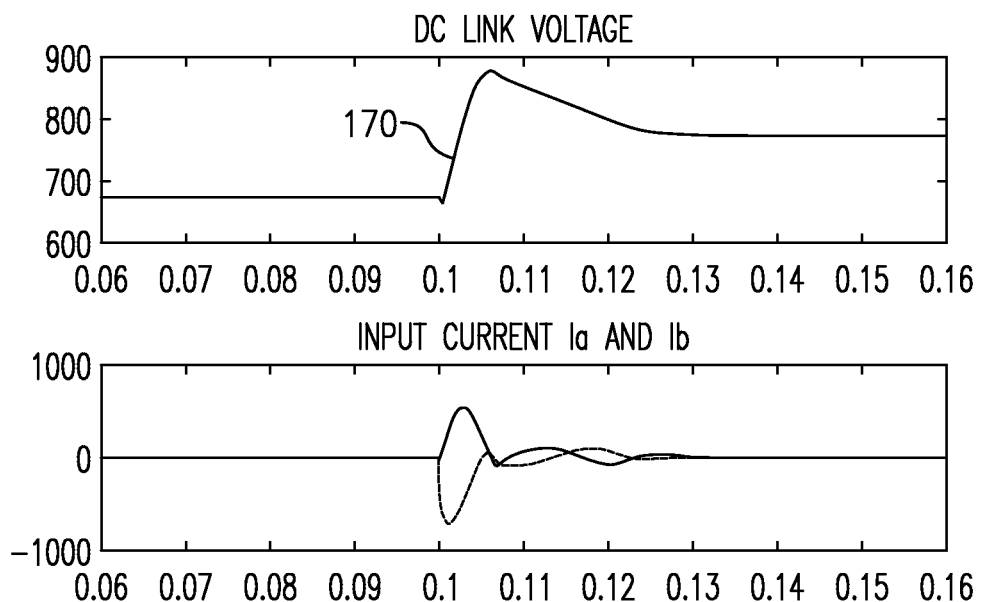
FIG. 7 graphically shows a simulation of boost rectifier operation without implementing control modeling, according to an embodiment.

FIGS. 6-9 represent an example implementation of the disclosed control method. FIG. 6 shows an example boost rectifier power converter for converting AC power to DC power. FIG. 7 shows a simulation of the boost rectifier without implementing control modeling by a soft start control algorithm. As shown at 170, there is an immediate high spike in voltage at the DC Link when an increase in the voltage at the DC Link was desired.

Figure 8:
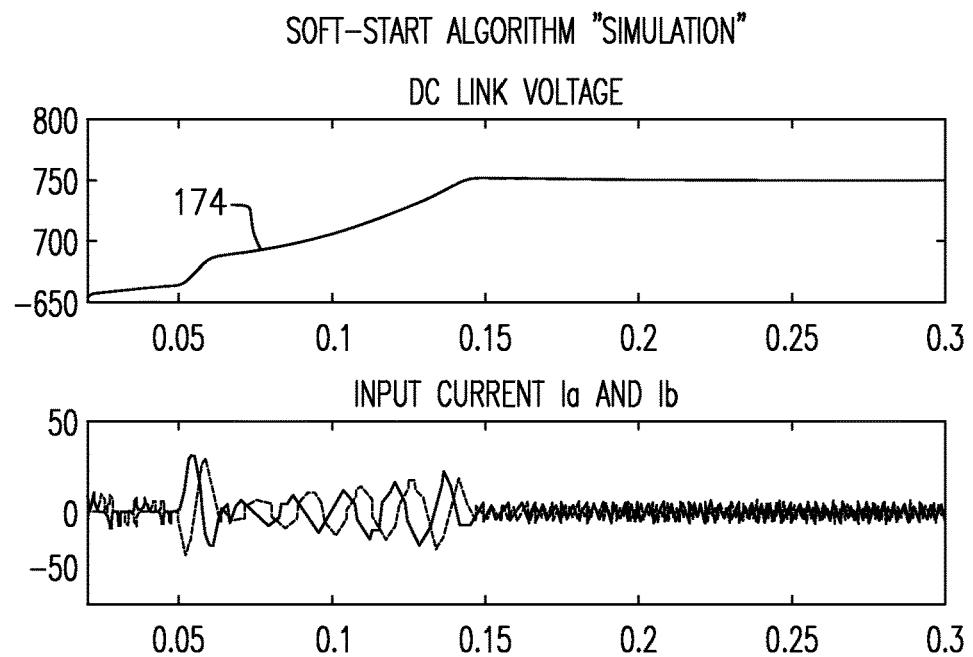
FIG. 8 graphically shows a simulation of boost rectifier operation based on using control modeling, according to an embodiment.
Figure 9:
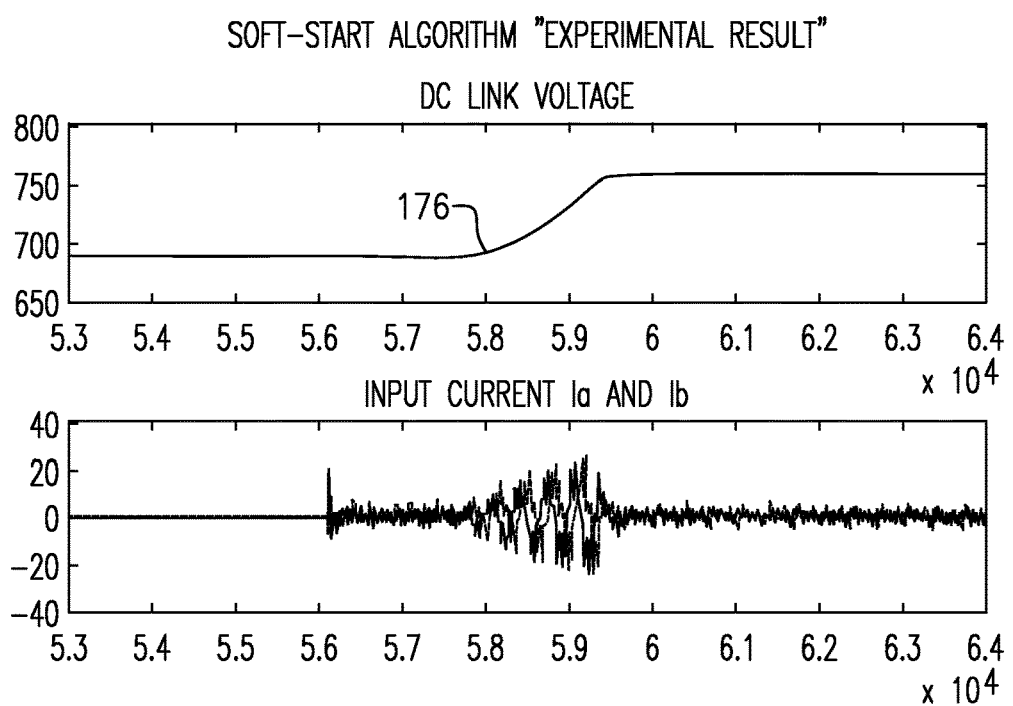
FIG. 9 graphically shows a resulting boost rectifier operation when the conversion device is implemented from the control modeling, according to an embodiment.

FIG. 8 shows a simulation where control modeling using a soft start algorithm is used. That is, at the modeling stage, the software modules 148 operate to control a model rectifier to create a gradual increase 174 in voltage at the DC Link when an increase in voltage at the DC Link is desired. FIG. 9 then shows the result after implementation of the soft start algorithm software modules 148 onto the control board 127 of the universal power conversion cell 126 operating as a boost rectifier. The resulting gradual increase 176 in DC Link voltage of the actual rectifier is similar to the gradual increase 174 in DC Link voltage in the model rectifier.

Although different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments. Although a particular component arrangement is disclosed and illustrated in these exemplary embodiments, other arrangements could also benefit from the teachings of this disclosure.

The preceding description is exemplary rather than limiting in nature. Variations and modifications to the disclosed examples may become apparent to those skilled in the art that do not necessarily depart from the essence of this disclosure. Thus, the scope of legal protection can only be determined by studying the following claims.

We claim:

1. A system for configuring a power conversion device for use with a selected apparatus that is associated with a distributed power system, comprising:
a modeling device including a model control board configured to receive a plurality of software modules for modeling a power conversion for the selected apparatus;
a simulator that utilizes the model control board with the software modules to simulate a power conversion for the selected apparatus;
an installer for installing the software modules onto a controller of a power conversion device that has a configuration of hardware components and the controller, wherein the configuration is the same for all of a plurality of power conversion devices, and each of the plurality of power conversion devices is configured to be associated with a variety of apparatus, the conversion device including the installed software modules being configured for power conversion associated with the selected apparatus.

2. The system as recited in claim 1, wherein the selected apparatus is at least one of a power source or a load.

3. The system as recited in claim 1, wherein the selected apparatus is a wind turbine.

4. The system as recited in claim 1, wherein the selected apparatus is a solar inverter.

5. The system as recited in claim 1, wherein the selected apparatus is a fuel cell.

6. The system as recited in claim 1, wherein the selected apparatus is a battery.

7. The system as recited in claim 1, wherein the selected apparatus is an appliance.

8. The system as recited in claim 1, wherein the selected apparatus is an HVAC system.

9. The system as recited in claim 1, wherein the selected apparatus is an elevator.

10. The system as recited in claim 1, wherein the selected apparatus is a lighting system.

11. The system as recited in claim 1, wherein the selected apparatus is an ultra-capacitor.

12. The system as recited in claim 1, wherein the software modules are imported from the model control board onto the controller.

13. A power conversion device comprising:
a configuration of hardware components operable to control a power conversion of a selected one of a variety of apparatus; and
a controller configured to receive one or more software modules for the controlling the power conversion of the selected one of the variety of apparatus, wherein the one or more software modules are selected based on the selected one of the variety of apparatus and the results of a software simulation.

14. The power conversion device of claim 13, wherein the software modules are imported from a model control board of a simulator onto the controller.

15. A method of configuring a power conversion cell for a distributed power system, comprising:
performing a software simulation, the software simulation comprising modeling one or more software modules on a modeling control board in a simulation mode to simulate a power conversion involving a load device or a source device, and obtaining simulation results from the simulation mode;
determining if the simulation results meet at least one predetermined criteria;
altering at least one module of the one or more modules if the simulation results do not meet the at least one predetermined criteria;
repeating the modeling step and the altering until the simulation results meet the at least one predetermined criteria; and
importing the one or more modules onto a controller of a conversion device when the simulation results meet the at least one predetermined criteria, the conversion device configured to control power conversion.

16. The method as recited in claim 15, wherein the load device or source device is an alternating current source.

17. The method as recited in claim 15, wherein the load device or source device is a direct current source.

18. The method as recited in claim 15, wherein the load device or source device is one of a wind turbine or a solar inverter.

19. The method as recited in claim 15, wherein the conversion device has a configuration of hardware components and the controller, and the conversion device is configured to be associated with a variety of apparatus.

20. The power conversion device as recited in claim 13, wherein the configuration of the hardware components and the controller is the same for each of the variety of apparatus.

* * * * *